United States Patent [19]
Pitner

[11] 3,788,100
[45] Jan. 29, 1974

[54] SEALING DEVICE FOR A UNIVERSAL JOINT
[75] Inventor: Alfred Pitner, Paris, France
[73] Assignee: Nadella, Rueil-Malmaison, France
[22] Filed: Jan. 14, 1972
[21] Appl. No.: 217,901

[30] Foreign Application Priority Data
Feb. 1, 1971   France .............................. 7103272

[52] U.S. Cl. ................ 64/17 A, 277/95, 308/187.1
[51] Int. Cl. ........................................... F16d 3/26
[58] Field of Search ......... 64/17 A, 17 R, 308/187.1
  187.2; 277/95, 205

[56] References Cited
UNITED STATES PATENTS
2,896,433  7/1959  Hempel ............................. 64/17 A
3,200,615  8/1965  Stokely ............................. 64/17 A
2,773,366  11/1956  Slaght ............................... 64/17 A
2,773,367  11/1956  Slaght ............................... 64/17 A
3,218,692  11/1965  Kayser .............................. 64/17 A
3,324,681  6/1967  Burns et al. ........................ 64/17 A Primary Examiner—Benjamin W. Wyche
Assistant Examiner—Randall Heald
Attorney, Agent, or Firm—Robert E. Burns; Emmanuel J. Lobato

[57] ABSTRACT

Sealing device for a universal joint comprising a sealing ring of elastomer extending around each trunnion and compressed between a shoulder of the trunnion and the needle retaining flange of a needle bearing interposed between the trunnion and a bore of the yoke branch. Each ring has two concentric annular portions which are in sliding sealing contact with the flange and are separated by at least one continuous groove whereby a suction effect is created between the sealing ring and the flange.

23 Claims, 7 Drawing Figures

PATENTED JAN 29 1974　　3,788,100

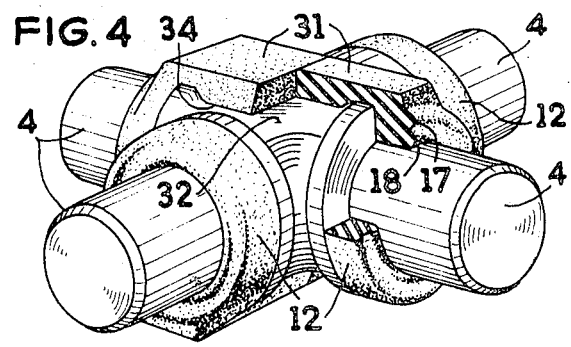
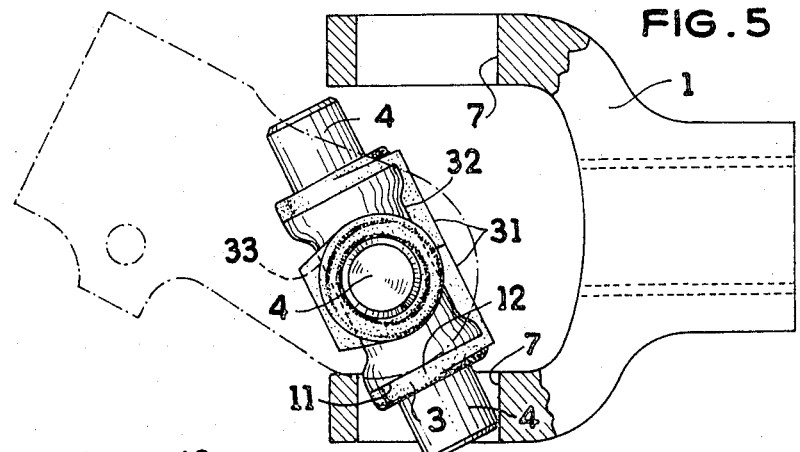
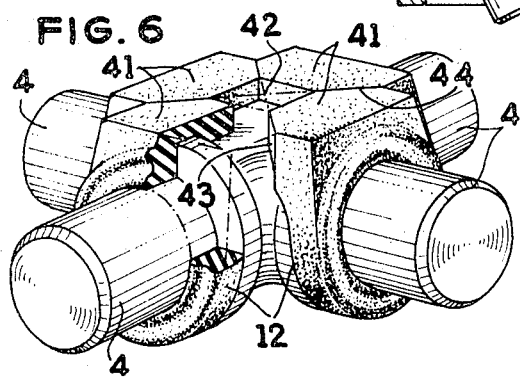
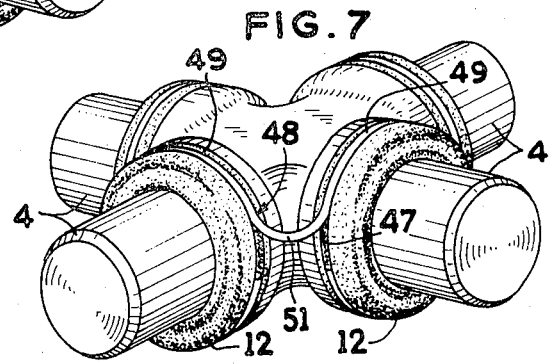

SEALING DEVICE FOR A UNIVERSAL JOINT

The present invention relates to a sealing device for a universal joint comprising two yokes and a cross member having four trunnions. Each of the trunnions has a shoulder and is capped by a needle cup which is of cold-formed sheet metal and retained in the bore of the corresponding branch of the yoke and has a flange for axially retaining the needles against movement toward the centre of the cross member. The sealing device comprises around each trunnion a ring of elastomer or deformable material which is compressed between the flange of the corresponding cup and the shoulder of the corresponding trunnion.

One of the advantages of this arrangement is that the cup, which is obtained by drawing sheet metal and has been heat treated, has a very smooth and even a polished outer surface having high surface hardness owing to the carbon enrichment due to the heat treatment, so that the flange of this cup in contact with which the sealing ring slides presents a surface to the ring which is perfectly adapted to the sealing function and which may be still further improved by giving the flange a convex configuration.

The sealing contact is achieved mostly by means of a lip portion which wipes the flange and is exposed to exterior actions which might be harmful when it concerns for example projections of water and mud. The lip portion may then no longer bear against the flange, in which case the seal is lost and is liable to undergo wear, which also impairs the seal.

An object of the invention is to provide an arrangement which avoids the defects just mentioned.

The invention provides a sealing device for a universal joint comprising two yokes and a cross member having four trunnions each of which has a shoulder and is capped by a needle bearing cup which is of colo-formed sheet metal and retained in the bore of the corresponding branch of the yoke and has a flange for axially retaining the bearing needles in respect of movement toward the centre of the cross member, the sealing device comprising around each trunion a sealing ring, for example of elastomer, compressed between the flange and the shoulder of the corresponding trunnion, wherein each sealing ring comprises two concentric annular portions which are in sliding sealing contact with the smooth face of the flange of the corresponding cup and are separated by at least one continuous groove whereby a suction effect is created.

The groove may be provided with lubricant.

The structure comprising the two sliding annular portions and the groove creates with respect to the flange a suction effect which affords a high-quality seal and prevents for example the outer annular portion from moving away from the flange of the cup under the effect of exterior actions. The quality of the seal is of long duration since the inner lip portion is protected both by the outer lip portion and possibly in addition by the lubricant or grease contained in the groove which may also continue its action after wear of the outer lip portion. This grease may for example include an added water repellent agent which enhances its protecting function.

In some cases, this advantage can only be ensured in combination with another feature of the invention according to which the sealing ring, for example of elastomer, is held rigidly stationary with respect to the cross member. Indeed, without effectively and durably holding the sealing ring stationary, the aforementioned suction effect would have a tendency to cause the sealing ring to be driven in rotation by the cup which would produce sliding between the face of the sealing ring opposed to the cup and the shoulder of the trunnion which would be undesirable if the condition of the surface of the shoulder does not have the required quality for such a sliding contact, unless of course a costly polishing operation has been carried out on this shoulder. The resulting wear would reduce the compression of the sealing ring and allow through infiltrations so that the sealing system would become ineffective.

The sealing ring can be rigidly or positively held stationary with respect to the cross member by any means, for example by :

adhesion;

adherence by the effect of suction;

interpenetration of the surfaces of the sealing ring and the shoulder in the manner of a meshing;

presence on the sealing ring of one or more projecting portions for achieving a mechanical locking with respect to the cross member;

a mechanical connection by means of a distinct element between two adjacent sealing rings or between the sealing ring and the cross member;

relative co-operation between extension portions of at least two sealing rings which creates a reciprocal abutment effect circumferentially of the trunnions.

Further features and advantages of the invention will be apparent from the ensuing description with reference to the accompanying drawings.

In the drawings :

FIG. 4 is a perspective view of a cross member of a universal joint provided with sealing rings in conformity with a fourth embodiment of a sealing device;

FIG. 5 is a diagrammatic view showing the manner in which the cross member shown in FIG. 4 can be mounted in a yoke by a tilting movement of the cross member, and FIGS. 6 and 7 are perspective views similar to FIG. 4 showing other embodiments of sealing rings.

Figure 1:
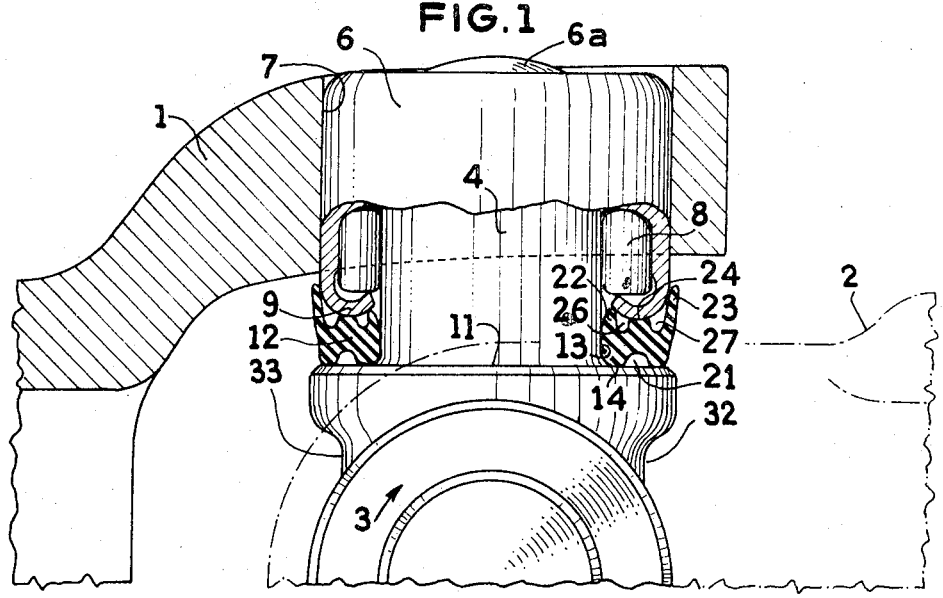
FIG. 1 is a partial axial sectional view of a universal joint with one embodiment of a sealing device according to the invention.

FIG. 1 shows a universal joint comprising two yokes 1 and 2 and a cross member 3 whose trunnions 4 are each capped by a cup 6 of cold-formed sheet metal fitted in the bore of the corresponding yoke branch 7 and containing needles 8 which are axially retained at the end of the cup opposed to the end wall 6a by a radial convex ledge or flange 9 whose surface is smooth and polished owing to the fact that the cup has been produced by a cold-forming operation. Compressed between the flange 5 and the shoulder 11 of the trunnion is an elastomer sealing ring 12 having a cylindrical inner face 13 which radially grips the outer face of the trunnion 4.

This radial gripping serves to fix the sealing ring 12 in position on the trunnion 4 which is particularly reinforced by the adherence of the lower face 14 of the ring in contact with the shoulder 11 under the suction effect created by a groove 21 formed in the lower face 14 roughly midway between the lateral faces of the ring.

The upper face of the ring 12 has two end lip portions 22 and 23, the inner lip portion 22 being in sliding contact with the flange 9 of the cup. The outer lip portion 23 is in a radially expanded condition and amply covers or overlaps the flange 9 of the cup 6, its outer edge reaching or extending beyond the zone on the cylindrical body of the cup where the flange 9 starts so that the lip portion 23 exerts on the cup a radial gripping action which is to a large extent independent of the relative axial position of the component parts. Moreover, a flange-contacting portion 24 of large radial extent is provided between the two lip portions 22 and 23 and fits the shape of the outer convex surface of the flange 9 and performs a sealing function. Further, the portion 24 incidentally acts as an abutment for the cup 6 in respect of axial displacements of the cup 6 with respect to the trunnion 4. Two grooves 26 and 27 are formed between the portion 24 and the lip portions 22 and 23. These grooves are filled with lubricant, preferably including a waterproof additive, which creates a suction effect on the adjacent flange 9 and thus improves the quality of the seal. The outer groove 27, protected by the contact of the lip portion 23 with the cup 6, acts as a container for foreign bodies which might have entered so that they cannot impair the quality of the contact between the portion 24 and the flange 9.

In view of the quality of the seal obtained, it is possible to make a judicious choice of the material and general dimensions of the sealing ring which in particular ensure an axial compression which is such as to create, when the cup is placed in position, an increased pressure inside the cup which improves the resistance to penetration of foreign bodies.

Figure 2:
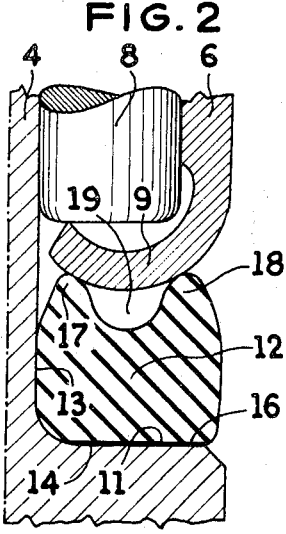
FIG. 2 is a sectional view of a second embodiment of a sealing device.

In FIG. 2, the connection between the trunnion 4 and the ring 12, which has a generally rectangular cross sectional shape, is reinforced by means of a layer of adhesive 16 interconnecting the shoulder 11 and the plane face 14 of the ring 12. The upper face of the ring has two beads 17 and 18 which correspond to the upper corners of the section of the ring and are in sliding contact with the flange 9 of the cup. These beads are spaced widely apart and define an intermediate groove 19 which, like the grooves 26 and 27 shown in FIG. 1, is filled with lubricant and produces a suction effect improving the seal.

Figure 3:
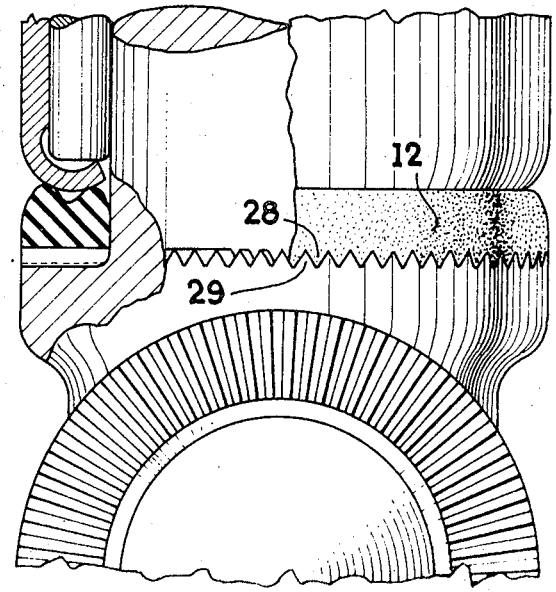
FIG. 3 is a partial elevational view of a third embodiment of a sealing device.

In FIG. 3, the ring 12 is fixed with respect to the cross member 3 by a circumferential serration 28 formed in the lower face of the ring 12 and extending into the hollows of corresponding serrations 29 provided in the shoulder 11. Instead of continuous serrations, it will be understood that one or more projecting portions may be provided in the ring 12 which extend into corresponding hollow portions in the shoulder 11.

In FIG. 4, the sealing rings 12 are arranged in two pairs each of which corresponds to two coaxial trunnions 4. The rings 12 of the same pair, which have for example two sealing beads 17 and 18 as in the embodiment shown in FIG. 1, are provided with an extension portion 31 constituting a relatively rigid face whose two main dimensions are parallel to the main axes of the cross member and whose edges 34 are in contact with a common generally plane central face 32 of the cross member. This plane face therefore performs the function of an abutment for the extension portions 31 preventing rotation of the two rings 12 of the same pair.

The other plane central face 33 (FIG. 5) of the cross member 3 also constitutes an abutment for the rings 12 of the other pair of trunnions. FIG. 5 shows that the arrangement shown in FIG. 4 does not preclude the mounting of the cross member 3 inside the branches of a yoke by a tilting of this cross member, the extension portions 31 corresponding to the pair of trunnions 4 which must be inserted in the corresponding bores 7 facing the interior of the yoke so that in the region of the opposite side of the trunnions the portions of the trunnions defining the shoulder 11 are bare and allow the introduction of the trunnions.

Whereas in FIG. 4 the extension portions 31 of the ring 12 are relatively thick so as to be capable of opposing any torque transmitted to the ring 12, the extension portions 41 provided in the embodiment shown in FIG. 6 are relatively thin. However, each extension portion has an approximately trapezoidal shape the small side 42 of which coincides with the centre of the cross member and is so shaped that the sides 43, 44 of the respective trapeziums are in contact in pairs. The four extension portions 41 therefore perform the function of reciprocal abutments which prevent the rings 12 from rotating with respect to the cross member.

Whereas the arrangement shown in FIG. 4 allows the pre-assembly of each pair of trunnions 4 in the corresponding yokes to be carried out successively by tilting without any hindrance due to the presence of the extension portions 31 arranged on the two plane central faces 32, 33 of the cross member, this is not the case with the embodiment shown in FIG. 6 which requires, after pre-assembly of one of the pairs of trunnions, rotating the cross member through 180° about the axis of the trunnions engaged in the corresponding yokes so that the face 32 or 33 which is covered by the extension portions 41 is presented inwardly of the second yoke for introducing the other pair of trunnions in the latter.

In FIG. 7, a mechanical means 48, for example constituted by a preformed metal wire, affords an invariable connection between two rings 12 which are mounted on adjacent trunnions 4 perpendicular to each other. The connecting means 48 comprises two loop portions 49 which engage and grip grooves 47 formed in the outer peripheral face of the respective rings 12, the two loop portions being interconnected by a centre portion 51.

Having now described my invention what I claim and desire to secure by Letters Patent is:

1. A sealing device for a universal joint comprising two yokes and a cross member having a centre and four trunnions each of which trunnions has a shoulder, and a needle bearing cup which caps each trunnion and consists of a cold-formed sheet metal member and is retained in a bore of the corresponding yoke and has a cylindrical body portion and a smooth-surfaced flange for axially retaining the bearing needles in respect of movement toward the centre of the cross member, the sealing device comprising, in combination with the cup and trunnion and disposed around each trunnion, an elastomer sealing ring in an axially compressed condition between and in contact with the flange of the cup and the shoulder of the corresponding trunnion, each sealing ring comprising two concentric annular portions both of which portions are free to bend radially away from each other and are in freely slidable sealing contact with the smooth surface of the flange of the corresponding cup and are separated by at least one continuous groove and the smooth surface of the flange having a shape facilitating a radial spreading apart of the annular portions upon axial compression of the sealing ring against the flange whereby a suction effect is created between the sealing ring and the flange.

2. A device as claimed in claim 1, wherein one of the concentric annular portions constitutes a lip portion which is adapted to be applied against the cylindrical body portion of the cup so that the sealing contact is to a large extent independent of the relative positions of the cup, ring and trunnion radially of said centre.

3. A sealing device for a universal joint comprising two yokes and a cross member having a centre and four trunnions each of which trunnions has a shoulder, and a needle bearing cup which caps each trunnion and consists of a cold-formed sheet metal member and is retained in a bore of the corresponding yoke and has a cylindrical body portion and a smooth-surfaced flange for axially retaining the bearing needles in respect of movement toward the centre of the cross-member, the sealing device comprising, in combination with the cup and trunnion and disposed around each trunnion, an elastomer sealing ring in an axially compressed condition between and in contact with the flange of the cup and the shoulder of the corresponding trunnion, each sealing ring comprising two concentric inner and outer annular portions both of which portions are free to bend radially away from each other and are in freely slidable sealing contact with the smooth surface of the flange of the corresponding cup and two concentric continuous grooves located respectively in the immediately vicinity of one and the other of the annular portions and an intermediate annular portion which is in contact with the flange and located between the two grooves and the smooth surface of the flange having a shape facilitating a radial spreading apart of the inner and outer annular portions upon axial compression of the sealing ring, whereby a suction effect is created between the sealing ring and the flange.

4. A device as claimed in claim 1, comprising a lubricant in the continuous groove of the ring.

5. A device as claimed in claim 4, wherein the lubricant contains a waterproof additive.

6. A device as claimed in claim 1, wherein each ring has such material and dimensions that the ring is in an axially compressed condition between the flange and shoulder so that there is an increased pressure inside the cup which improves the resistance to penetration of foreign bodies into the cup.

7. A sealing device for a universal joint comprising two yokes and a cross member having a centre and four trunnions each of which trunnions has a shoulder, and a needle bearing cup which caps each trunnion and consists of a cold-formed sheet metal member and is retained in a bore of the corresponding yoke and has a cylindrical body portion and a smooth-surfaced flange for axially retaining the bearing needles in respect of movement toward the centre of the cross member, the sealing device comprising, in combination with the cup and trunnion and disposed around each trunnion, an elastomer sealing ring in an axially compressed condition between and in contact with the flange of the cup and the shoulder of the corresponding trunnion, each sealing ring comprising two concentric annular portions both of which portions are free to bend radially away from each other and are in freely slidable sealing contact with the smooth surface of the flange of the corresponding cup and are separated by at least one continuous groove, a convex substantially rounded outer shape which defines radially outer and inner surface portions which taper in a direction away from an end of the cup remote from the flange, the concentric annular portions respectively engaging the inner and outer surface portions of the flange whereby the concentric annular portions tend to be spread apart radially upon axial compression of the sealing ring against the flange and a suction effect is created between the sealing ring and the flange.

8. A device as claimed in claim 1, wherein the ring has an inner annular face which is in radially gripping relation to an outer cylindrical face of the trunnion.

9. A sealing device for a universal joint comprising two yokes and a cross member having a centre and four trunnions each of which trunnions has a shoulder, and a needle bearing cup which caps each trunnion and consists of a cold-formed sheet metal member and is retained in a bore of the corresponding yoke and has a cylindrical body portion and a smooth-surfaced flange for axially retaining the bearing needles in respect of movement toward the centre of the cross member, the sealing device comprising, in combination with the cup and trunnion and disposed around each trunnion, an elastomer sealing ring in an axially compressed condition between and in contact with the flange of the cup and the shoulder of the corresponding trunnion, each sealing ring comprising two concentric annular portions both of which portions are free to bend radially away from each other and are in freely slidable sealing contact with the smooth surface of the flange of the corresponding cup and are separated by at least one continuous groove and the smooth surface of the flange having a shape facilitating a radial spreading apart of the annular portions upon axial compression of the sealing ring against the flange whereby a suction effect is created between the sealing ring and the flange, and means preventing the ring from rotating about the trunnion.

10. A device as claimed in claim 9, comprising an adhesive fixing the ring to the trunnion.

11. A device as claimed in claim 10, wherein the ring is fixed to an outer cylindrical face of the trunnion by the adhesive.

12. A device as claimed in claim 10, wherein the ring is fixed to a shoulder of the trunnion by the adhesive.

13. A device as claimed in claim 9, wherein the ring has an annular surface in contact with the shoulder of the trunnion and an annular groove in said annular surface which produces a connection with the shoulder of the trunnion by a suction effect created by the groove in said annular surface, the shoulder defining an annular face which is substantially contained in a plane perpendicular to the axis of the trunnion and bearing cup, said annular face of the shoulder being in contact with said annular surface of the ring.

14. A device as claimed in claim 13, wherein the annular face of the shoulder is contained in said plane.

15. A sealing device for a universal joint comprising two yokes and a cross member having a centre and four trunnions each of which trunnions has a shoulder, and a needle bearing cup which caps each trunnion and consists of a cold-formed sheet metal member and is retained in a bore of the corresponding yoke and has a cylindrical body portion and a smooth-surfaced flange for axially retaining the bearing needles in respect of movement toward the centre of the cross member, the sealing device comprising, in combination with the cup and trunnion and disposed around each trunnion, an elastomer sealing ring in an axially compressed condition between and in contact with the flange of the cup and the shoulder of the corresponding trunnion, each sealing ring comprising two concentric annular portions both of which portions are free to bend radially away from each other and are in freely slidable sealing contact with the smooth surface of the flange of the corresponding cup and are separated by at least one continuous groove and the smooth surface of the flange having a shape facilitating a radial spreading apart of the annular portions upon axial compression of the sealing ring against the flange whereby a suction effect is created between the sealing ring and the flange, and means defining an interpenetration between the ring and the trunnion to prevent relative rotation between the ring and the trunnion.

16. A device as claimed in claim 15, wherein the means defining an interpenetration comprise a face on the ring and a face on the trunnion, projecting portions on one of the faces and hollow portions on the other of said faces, the projecting portions extending into said hollow portions.

17. A sealing device for a universal joint comprising two yokes and a cross member having a substantially plane centre and four trunnions each of which trunnions has a shoulder, and a needle bearing cup which caps each trunnion and consists of a cold-formed sheet metal member and is retained in a bore of the corresponding yoke and has a cylindrical body portion and a smooth-surfaced flange for axially retaining the bearing needles in respect of movement toward the centre of the cross-member, the sealing device comprising, in combination with the cup and trunnion and disposed area each trunnion an elastomer sealing ring in an axially compressed condition between and in contact with the flange of the cup and the shoulder of the corresponding trunnion, each sealing ring comprising two concentric annular portions both of which portions are free to bend radially away from each other and are in freely slidable sealing contact with the smooth surface of the flange of the corresponding cup and are separated by at least one continuous groove and the smooth surface of the flange having a shape facilitating a radial spreading apart of the annular portions upon axial compression of the sealing ring against the flange whereby a suction effect is created between the sealing ring and the flange, and means preventing the ring from rotating about the trunnion comprising a locking extension portion which partially covers and engages the substantially plane centre face.

18. A device as claimed in claim 17, wherein the extension portion defines a face extending in two directions substantially parallel to the axes of the trunnions and engaging the centre face.

19. A device as claimed in claim 17, wherein the cross member has substantially plane centre faces on opposed sides of the cross member from which centre face the trunnions extend, marginal portions of the two extension portions of the ring carried by two coaxial trunnions being in abutting relation to the same centre face of the cross member and preventing rotation of the corresponding rings, the extension portions of the rings of the other two coaxial trunnions being in abutting relation to the other plane centre face of the cross member.

20. A device as claimed in claim 18, wherein each of the four extension portions relatively pertaining to the four rings has substantially the shape of a trapezium having two sides diverging from the centre face of the cross member and in reciprocal abutting relation with the divergent sides of the adjacent extension portions so as to prevent the rings from rotating on the trunnions, said extension portions engaging said centre face of the cross member.

21. A device as claimed in claim 1, comprising mechanical means which connect each ring to the ring of an adjacent trunnion and prevents the interconnected rings from rotating on the corresponding trunnions.

22. A device as claimed in claim 21, wherein the mechanical means comprise outer peripheral grooves in the rings and a metal wire for each adjacent pair of rings having two loop portions which respectively engage and grip the outer grooves of the rings, the two loop portions of each wire being rigidly interconnected.

23. A device as claimed in claim 1, wherein the sealing ring is of elastomer.

* * * * *

UNITED STATES PATENT OFFICE
CERTIFICATE OF CORRECTION

Patent No. 3,788,100         Dated January 29, 1974

Inventor(s) Alfred PITNER

It is certified that error appears in the above-identified patent and that said Letters Patent are hereby corrected as shown below:

In the Heading of the patent, Item [73] Assignee, should be amended by making the following insertion beneath the Assignee's address:

--of a one-half interest--

Signed and sealed this 14th day of May 1974.

(SEAL)
Attest:

EDWARD M. FLETCHER, JR.
Attesting Officer

C. MARSHALL DANN
Commissioner of Patents